United States Patent
Kohno et al.

(10) Patent No.: US 6,728,294 B1
(45) Date of Patent: Apr. 27, 2004

(54) RADIO COMMUNICATION SYSTEM

(75) Inventors: Ryuji Kohno, 1202-9 Hazawa-cho, Kanagawa-ku, Yokohama-shi, Kanagawa (JP); Hiroki Mochizuki, Numazu (JP)

(73) Assignees: Toshiba Tec Kabushiki Kaisha, Tokyo (JP); Ryuji Kohno, Yokohama (JP)

( * ) Notice: Subject to any disclaimer, the term of this patent is extended or adjusted under 35 U.S.C. 154(b) by 0 days.

(21) Appl. No.: 09/575,995

(22) Filed: May 23, 2000

(30) Foreign Application Priority Data

May 24, 1999 (JP) ........................... 11-143464

(51) Int. Cl.⁷ ............................................. H04L 27/30
(52) U.S. Cl. ...................... 375/133; 375/135; 375/267; 375/340; 370/281; 370/295; 370/330; 370/436; 370/478; 342/81; 342/367; 342/368; 342/380; 342/382
(58) Field of Search ................................ 375/130, 132, 375/133, 135, 136, 138, 259, 260, 267, 295, 316, 340; 370/278, 280–282, 294, 295, 302, 328–330, 338, 341, 342, 433, 436, 441, 478–480; 342/77, 81, 89, 90, 360, 367, 368, 380–382, 777

(56) References Cited

U.S. PATENT DOCUMENTS

| | | | |
|---|---|---|---|
| 4,800,390 A | | 1/1989 | Searle |
| 5,396,256 A | * | 3/1995 | Chiba et al. ................. 342/372 |
| 5,481,570 A | * | 1/1996 | Winters ....................... 375/347 |
| 5,585,803 A | * | 12/1996 | Miura et al. ................. 342/372 |
| 5,754,138 A | * | 5/1998 | Turcotte et al. ............. 342/373 |
| 5,949,776 A | * | 9/1999 | Mahany et al. ............. 370/338 |
| 6,075,484 A | * | 6/2000 | Daniel et al. ............... 342/372 |
| 6,198,925 B1 | * | 3/2001 | Lee ............................. 455/434 |

FOREIGN PATENT DOCUMENTS

JP  9-219615  8/1997

\* cited by examiner

Primary Examiner—Stephen Chin
Assistant Examiner—Dac V. Ha
(74) Attorney, Agent, or Firm—Frishauf, Holtz, Goodman & Chick, P.C.

(57) ABSTRACT

A microprocessor reads the information such as directions of arrival about a desired wave and an undesired wave for every terminal station and for every hopping frequency, and their receiving powers, and the like, from a desired wave/undesired wave information inputting unit. On the basis of the information items, the microprocessor calculates the weight values of a transmitting section and a receiving section for every terminal station and every hopping frequency, and stores them in a weight value table. At the time of performing radio communication, the microprocessor reads the weight values of the receiving section and the transmitting section corresponding to every terminal station and every hopping frequency from the weight value table every time the frequency is hopped, and sets them in attenuators, and phase shifters. As a result, the optimum directivity pattern is formed for every hopping frequency, and high-quality communication can be thereby achieved.

6 Claims, 8 Drawing Sheets

| fH=f1 | AMPLITUDE WEIGHT VALUES | | | | PHASE WEIGHT VALUES | | | |
|---|---|---|---|---|---|---|---|---|
| TERMINAL STATION N1 | A111 | A121 | A131 | A141 | P111 | P121 | P131 | P141 |
| TERMINAL STATION N2 | A211 | A221 | A231 | A241 | P211 | P221 | P231 | P241 |
| TERMINAL STATION N3 | A311 | A321 | A331 | A341 | P311 | P321 | P331 | P341 |
| | ⋮ | ⋮ | ⋮ | ⋮ | ⋮ | ⋮ | ⋮ | ⋮ |

291

| fH=fn | AMPLITUDE WEIGHT VALUES | | | | PHASE WEIGHT VALUES | | | |
|---|---|---|---|---|---|---|---|---|
| TERMINAL STATION N1 | A11n | A12n | A13n | A14n | P11n | P12n | P13n | P14n |
| TERMINAL STATION N2 | A21n | A22n | A23n | A24n | P21n | P22n | P23n | P24n |
| TERMINAL STATION N3 | A31n | A32n | A33n | A34n | P31n | P32n | P33n | P34n |
| | ⋮ | ⋮ | ⋮ | ⋮ | ⋮ | ⋮ | ⋮ | ⋮ |

Prior Art

RADIO COMMUNICATION SYSTEM

CROSS-REFERENCE TO RELATED APPLICATIONS

This application is based upon and claims the benefit of priority from the prior Japanese Patent Application No. 11-143464, filed May 24, 1999, the entire contents of which are incorporated herein by reference.

BACKGROUND OF THE INVENTION

The present invention relates to a radio communication system applied to, for example, an indoor radio LAN system so as to transmit and receive the data between a base station and a plurality of terminal stations in the frequency hopping spread spectrum system.

When the radio communication is made between the base station and the terminal stations in an indoor space, for example, it is strongly influenced by the fading caused by the multipass (a multiple reflection wave) and, therefore, transmitting and receiving the data while adjusting the directivity in a direction in which a maximum receiving wave comes is effective. To implement this, there is a system capable of surely performing the radio communication between the base station and the terminal stations by using adaptive array antennas and optimally controlling the directivity while varying weight values of the outputs of the respective antennas.

For example, the system of Jpn. Pat. Appln. KOKAI Publication No. 9-219615 comprises adaptive array antennas 1 composed of a plurality of antenna elements, weighting units 2 for multiplying transmitting and receiving signals of the respective antenna elements by coefficients of weighting that have been set and thereby weighting the amplitudes and phases, a dividing/combining unit 3 for distributing the transmitting signals to the respective antenna elements via the weighting units 2 and synchronizing the receiving signals from the antenna elements, a transmission/reception system 4, an interface 5 and an external operation unit 6, as shown in FIG. 11. The external operation unit 6 calculates the adaptive control of the directivity for every terminal of a communication partner at a non-real time, assigns in advance the time slots to the respective terminals at the time of transmission and reception, and switches the weight values for the respective terminals at time division.

Each weighting unit 2 varies the phase and the amplitude in a transmitting signal supplied from the dividing/synthesis unit 3 by predetermined amounts or multiply the signal by a complex weight. Thus, the radio waves radiated from the antenna elements form a desired synthetic transmission directional pattern.

On the other hand, the phase and the amplitude of each of the signals received by the plural antenna elements are controlled by the weighting units 2 or the signal is multiplied by the complex weight. Then, the signals are combined by the dividing/synthesis unit 3. The desired receiving directional pattern can be formed in this manner.

The system of this publication calculates in advance the directional adaptive control of the array antennas by the external operation unit 6 and controls the directivity by using the weight values that have already been calculated at the time of the communication with each terminal. Therefore, the system can be structurally simplified and miniaturized at lower costs as compared with a system that calculates the weight value at a real time (sequentially) during the communication.

Incidentally, the frequency hopping spread spectrum modulation that hops the frequency within a certain frequency band is known as one of the modulation systems. If the radio communication is made in such a frequency hopping spread spectrum modulation in the system of the above publication, the directivity of the array antennas is controlled by using the weight values that are calculated on the basis of a certain carrier frequency, for example, a center frequency in the carrier frequency band.

However, the frequency band used in the frequency hopping is wide. Therefore, when the communication is made with the frequencies at the edges of the frequency band.

BRIEF SUMMARY OF THE INVENTION

The object of the present invention is to provide a radio communication system for performing radio communication between a base station and terminal stations in the frequency hopping spread spectrum, which allows the radio communication to be certainly made at any time between the base station and each of the terminal stations even when the hopping is executed, and which has a simple structure.

Another object of the present invention is to provide a radio communication system which allow the control of the optimum directivity to sufficiently follow the change of the radio propagation environment and can thereby perform preferable radio communication.

To achieve these objects, according to one aspect of the present invention, there is provided a radio communication system including a base station and a plurality of terminal stations each communicate with the base station by radio in a frequency hopping spread spectrum. The base station includes a radio communication apparatus comprising a receiving section for demodulating a signal obtained by multiplying an amplitude and a phase of each of receiving signals from a plurality of antenna elements by weight values and synthesizing the signals, and a transmitting section for distributing the modulated signal into a plurality of signals, multiplying an amplitude and a phase of each of the divided signals by weight values, and radiating the signals from the respective antenna elements. The base station comprises weight value storing means for storing the weight values of the receiving section and the transmitting section in response to each of the terminal stations and each of hopping frequencies, and directivity controlling means, every time a carrier frequency is hopped at the time of performing radio communication with each of the terminal stations, for reading the weight values of the transmitting section and the receiving section responding to the frequency and each of the terminal stations from the weight value storing means, and controlling the directivity of the transmitting section and the receiving section.

The system of the present invention further comprises error rate detecting means for detecting variation in a data error rate in the signal received by the receiving section, for each of the terminal stations, and weight value rewriting means, when the error rate detecting means detects increase in the error rate of a terminal station, for calculating again and rewriting the weight values of the receiving section and the transmitting section corresponding to the terminal station in the weight value storing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram showing an example of setting weight values on weight value table in FIG. 2;

DETAILED DESCRIPTION OF THE INVENTION

Embodiments of the present invention will be explained below with reference to the drawings.

First Embodiment

Figure 1:
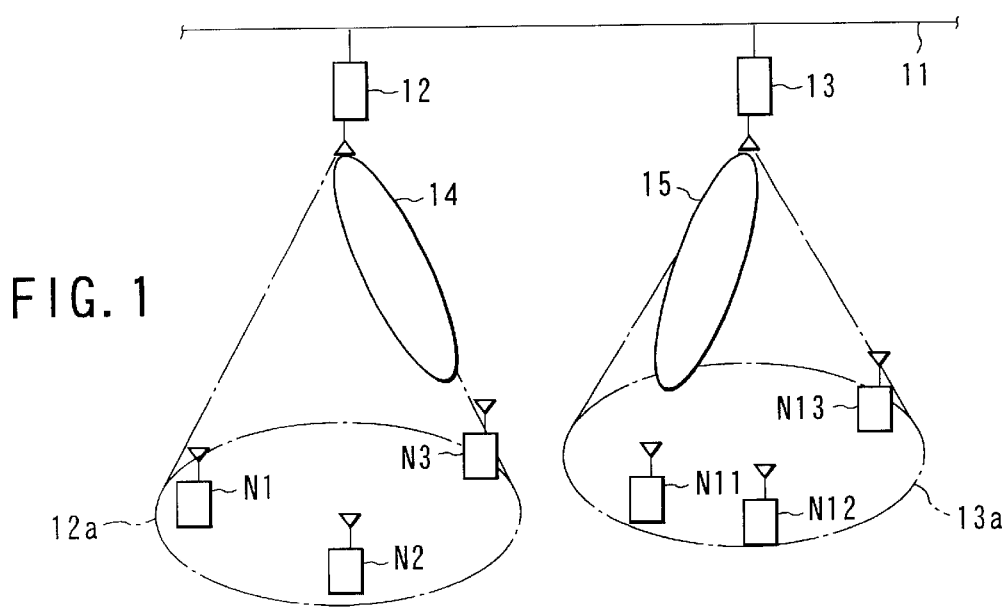
FIG. 1 is a diagram showing a structure of an indoor radio communication system according to a first embodiment of the present invention.

FIG. 1 shows the structure of an indoor radio communication system to which the present invention is applied. For example, base stations 12 and 13 are connected to LAN 11. Terminal stations N1, N2 and N3 are arranged in a service area 12a of the base station 12 and terminal stations N11, N12 and N13 are arranged in a service area 13a of the base station 13. The base stations 12 and 13 are generally provided on a ceiling in a shop or store.

The base stations 12 and 13 perform the radio communication with the terminal stations N1–N3 and N11–N13, respectively, in the frequency hopping spread spectrum system. The carrier frequency is periodically varied in the frequency hopping spread spectrum system. The band of the frequency hopping ranges, for example, from 2471 to 2497 MHz and twenty four channels are assigned to the band. In the radio communication, the order of the changed channels (carrier frequencies) is determined in advance between the base stations and the plural terminal stations corresponding thereto. Therefore, each of the terminal stations can predict which channel is used next to the current carrier frequency to perform the radio communication. The base stations 12 and 13 perform the communication by using directional beams 14 and 15 so as not to be influenced by the multipass fading or shadowing.

The terminal stations N1–N3 and N11–N13 are connected to, for example, respective POS terminals of a radio POS system. In the radio POS system, data is wirelessly transmitted and received between a host apparatus for managing the entire sales of the shop or store and a plurality of POS (point of sales) terminals for registering the goods sales data at respective counters. Each of the POS terminals is not used in a freely movable state, and it is not moved for a comparatively long time once it is located. Therefore, the directional beams 14 and 15 have the optimum directions and beam patterns for the respective terminal stations that are different in the locations.

When the terminal stations N1–N3 and N11–N13 perform the communication with the corresponding base stations 12 and 13, they may use the directional beam or the nondirectional beam, unlike the base stations.

Figure 2:
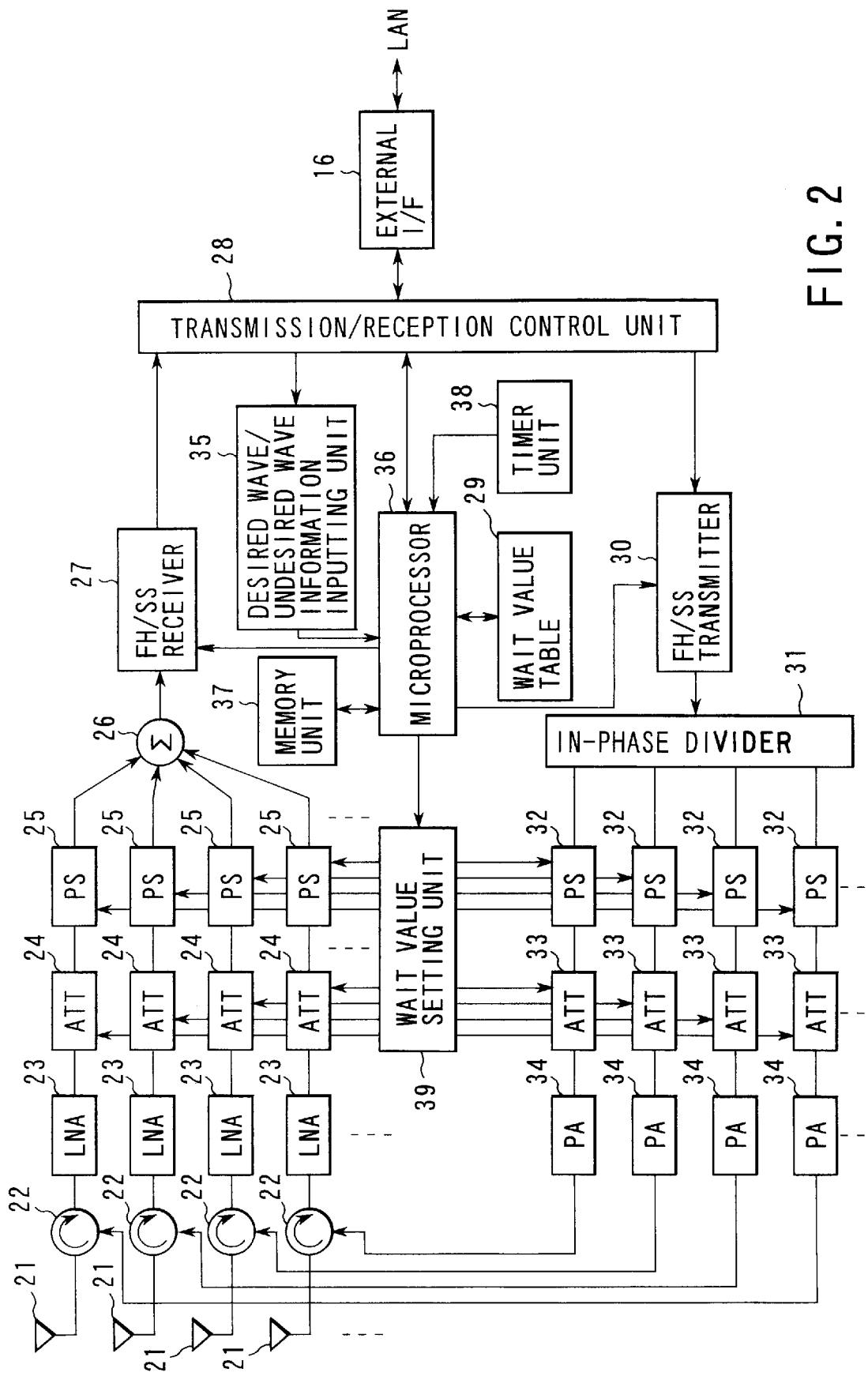
FIG. 2 is a block diagram showing a circuit configuration of a base station in the first embodiment.

FIG. 2 is a block diagram showing a circuit configuration of the base station according to the present invention. This base station comprises a plurality of antenna elements 21 for both transmission and reception, a plurality of circulators 22 provided in response to the respective antenna elements 21, a plurality of low-noise amplifiers (LNA) 23 for amplifying the receiving signals from the circulators 22, a plurality of attenuators (ATT) 24 for controlling the amplitude levels of the amplified signals, and a plurality of phase shifters (PS) 25 for controlling the phase.

The receiving signals that are output from the phase shifters 25 are combined by a linear combiner 26 and supplied to a receiver 27 in the frequency hopping spread spectrum modulation (FH/SS) system. The receiver 27 performs the receiving operation such as demodulation and outputs the receiving data. The receiving data is supplied to a transmission/reception control unit 28. The transmission/reception control unit 28 transmits the receiving data to the LAN 11 via an external interface (I/F) 16.

The antenna elements 21, the circulators 22, the low-noise amplifiers 23, the attenuators 24, the phase shifters 25, the linear combiner 26 and the receiver 27 constitute a receiving section. The attenuators 24 and the phase shifters 25 can independently control the amplitudes and the phases, and the control value is set on the basis of the weight value stored in a weight value table 29. A microprocessor 36 reads the weight value from the weight value table 29 and outputs it to a wait value setting unit 39. The wait value setting unit 39 outputs the weight value that is output from the microprocessor 36, to the attenuators 24 and the phase shifters 25, and holds the output value. Therefore, a desired receiving directional beam pattern is formed by appropriately weighting the receiving signals from the antenna elements 21 with the weight value from the weight value table 29.

A FH/SS transmitter 30 modulates the transmitting data from the transmission/reception control unit 28 in the frequency hopping spread spectrum modulation (FH/SS) system and provides a transmission signal. An in-phase divider 31 divides in phase the transmission signal from the transmitter 30 into signals whose number is equal to that of the antenna elements 21. A plurality of phase shifters (PS) 32 control the phases of the signals from the in-phase divider 31, and a plurality of attenuators (ATT) 33 control the amplitudes thereof. Power amplifiers (PA) 34 respectively amplify the signals from the attenuators (ATT) 33 and supply them to the circulators 22.

The transmitter 30, the in-phase divider 31, the phase shifters 32, the attenuators 33, the power amplifiers 34, the circulators 22 and the antenna elements 21 constitute a transmitting section. The attenuators 33 and the phase shifters 32 can independently control the amplitudes and the phases, and the control values are set as explained above, on the basis of the weight value from the weight value table 29. Therefore, the desired transmission directional beam is formed by appropriately weighting the transmission signal with the weight value from the wait value table 29.

Figure 3:
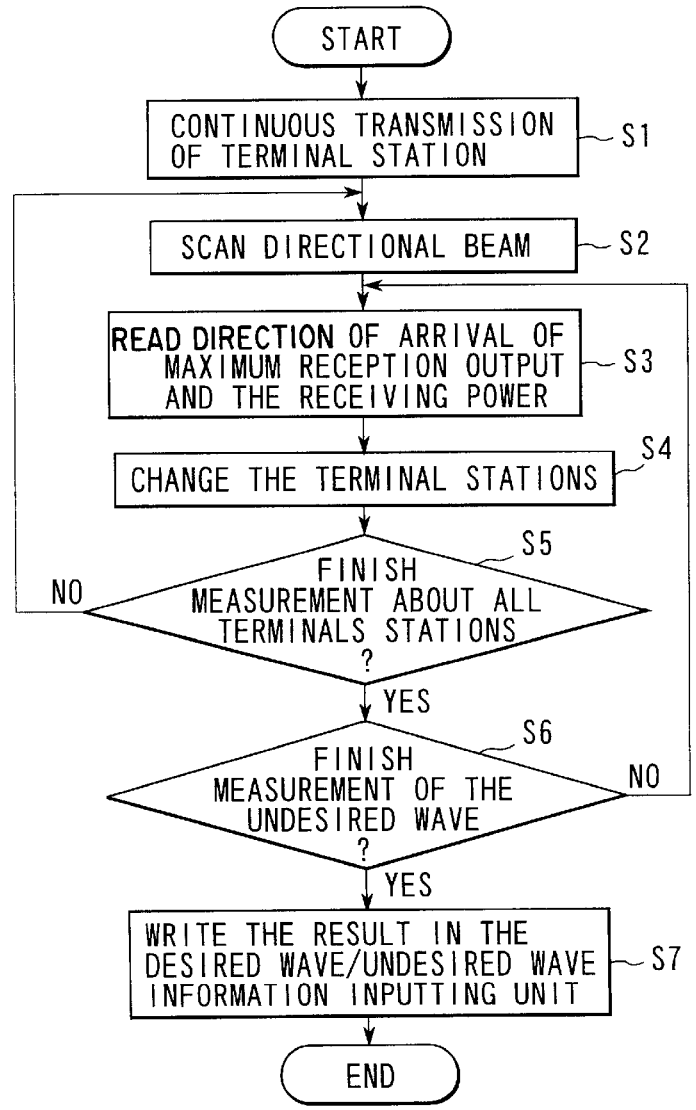
FIG. 3 is a flow chart showing an example of the base station's process of collecting the information such as the directions of arrival of the desired wave and the undesired wave and writing them to the desired wave/undesired wave information inputting unit.

A desired wave/undesired wave information inputting unit 35 stores a direction of arrival of a desired wave from each of the terminals, a direction of arrival of an undesired wave from an undesired wave generation source, and their reception powers. FIG. 3 is a flow chart showing an example of the base station's process of scanning the receiving directional beam, collecting the information about the directions of arrival of the desired wave and the undesired wave, and their reception powers, and writing them to the desired wave/undesired wave information inputting unit 35. Once the terminal stations N1–N3 and N11–N13 are location, their positions are not moved for a comparatively long time as mentioned above. Therefore, the positions of the terminal stations and the undesired wave generation source, i.e. the directions of arrival of the desired wave and the undesired wave from the terminal stations can be detected in advance at the base station. In addition, the receiving level of the desired wave and the undesired wave at every hopping frequency and the thermal noise generated at the antenna elements 21, and the like can be also detected in advance by the measurement and calculation.

The process shown in FIG. 3 is executed by the microprocessor 36, for example, when the base station and its corresponding terminal stations are installed. First, the continuous transmission of the terminal station is executed at step S1. This allows one single terminal station that wishes to measure the arriving direction of the desired wave to be in the continuously transmitting state. The receiving directional beam of the base station is scanned by controlling the phase and amplitude of each of the array antennas composed of the plural antenna elements 21 at step S2. The maximum receiving direction of the signal arriving from the terminal station and the receiving power of this time are measured at each hopping frequency at step S3. When this measurement has been finished, the terminal stations are exchanged at step S4 and the same process is repeated from step S2.

When the measurement has been finished about all the terminal stations, the undesired wave is measured. This measurement, for example, stops the transmission of all the terminal stations in the own service area and specifies the direction of arrival about the waves and the receiving power, and the like. When the measurement of the undesired wave has been finished, the obtained result is written in the desired wave/undesired wave information inputting unit 35 at step S7.

The explanation returns to FIG. 2. The microprocessor 36 controls the transmission/reception control unit 28 and also controls the wait value table 29 and a memory unit 37 on the basis of the information stored in the desired wave/undesired wave information inputting unit 35. That is, the microprocessor 36 calculates the wait value of the transmitting section and the receiving section that is optimum for each of the terminal stations at every hopping frequency, and writes it to the wait value table 29. When the microprocessor 36 performs the radio communication with the terminal station in the frequency hopping system, it reads the weight value of the transmitting section and the receiving section corresponding to each hopping frequency, about the corresponding terminals station, from the weight value table 29, and outputs it to the wait value setting unit 39, in response to a hopping frequency switching signal that is output from a timer unit 38. As a result, the directivity of the transmission and reception is controlled.

The microprocessor 36 varies the reception frequency of the receiver 27 and the transmission frequency of the transmitter 30 in response to the hopping frequency switching signal. The memory unit 37 stores the adaptive processing algorithm of the receiving section, an optimum directivity synthesizing algorithm of the transmitting section, the order of the channels (frequencies) used in the frequency hopping radio communication.

The microprocessor 36 calculates the optimum weight value of the receiving section and the transmitting section for every terminal station and every hopping frequency by use of the directions of arrival of the desired wave and undesired wave for every hopping frequency and the thermal noise value of each antenna element that are stored in the desired wave/undesired wave information inputting unit 35, and in accordance with both the adaptive processing theory of the adaptive array antenna and the directivity synthesizing theory of the array antenna.

FIG. 4 shows an example of setting the weight values for the respective terminal stations N1, N2, N3, . . . of the weight value table 29. This table stores, for every antenna element, the amplitude and phase weight values of the transmitting section and the receiving section that correspond to the respective hopping frequencies at every terminal station. That is, 291 of this figure shows a table storing the amplitude weight values A111, A121, A131, A141, . . . , A211, A221, A231, A241, . . . , A311, A321, A331, A341, . . . of the attenuator 24 and the phase weight values P111, P121, P131, P141, . . . , P211, P221, P231, P241, . . . , P311, P321, P331, P341, . . . of the phase shifter 25, in each antenna element of the receiving section with the hopping frequency f'H=f1 of the terminal stations N1, N2 and N3. 29n shows a table storing the amplitude weight values A11n, A12n, A13n, A14n, . . . , A21n, A22n, A23n, A24n, . . . , A31n, A32n, A33n, A34n, . . . of the attenuator 24 and the phase weight values P11n, P12n, P13n, P14n, . . . , P21n, P22n, P23n, P24n, . . . , P31n, P32n, P33n, P34n, . . . of the phase shifter 25, in each antenna element of the receiving section with the hopping frequency $f_H$=fn of the terminal stations N1, N2 and N3. This figure shows the tables of the receiving section, but the tables of the transmitting section are constituted similarly.

At the time of performing communication with the terminal station, the microprocessor 36 of the base station first identifies the terminal station that is to be a communication partner, for example, in accordance with the communication protocol. At this time, the microprocessor 36 reads the weight values of the transmitting section and the receiving section corresponding to the hopping frequency, about each terminal station, from the weight value table 29, at every frequency hopping, and outputs them to the weight value setting unit 39. Thus, the amplitudes of the attenuators 24 and 33, and the phases of the phase shifters 25 and 32 are controlled. Therefore, the optimum directivity pattern of the receiving section and the transmitting section is formed in accordance with the hopping frequency and then the communication is made.

The weight values of the receiving section stored on the weight value table 29 are calculated on the basis of the adaptive processing algorithm stored in the memory unit 37 by the microprocessor 36. As for the adaptive processing algorithm, the MSN (maximum signal to noise ratio), CMA (constant modulus algorithm) that is an algorithm for the constant envelope signals, and the like are generally known. To execute the calculation in accordance with the MSN algorithm, information items such as the direction of arrival and the receiving power of the desired wave from each terminal station at each hopping frequency, the direction of arrival and the receiving power of the undesired wave from the undesired wave generation source, the noise power of each antenna element, and the like are required.

These information items are collected in advance as described above, stored in the desired wave/undesired wave information inputting unit 35, and supplied to the microprocessor 36. On the basis of the information, the microprocessor 36 calculates the amplitude and phase weight values and stores them on the weight value table 29, for every terminal station, every antenna 21, and every hopping frequency, in accordance with an adaptive processing algorithm described later. The weight values calculated in this manner are read from the weight value setting unit 39 in response to each hopping frequency so as to control the attenuator 24 and the phase shifter 25 of each antenna element 21. As a result, the entire array antenna has strong reception directional characteristics in the direction of the desired wave from the terminal station, and forms null in the direction of the undesired wave, i.e. it has little sensitivity in the direction of the undesired wave. Thus, the adaptive array antenna is adaptive to the radio propagation environment.

Setting of the weight values of the receiving section has been explained above. The microprocessor 36 also calculates the weight values of the transmitting section on the basis of the information obtained at the receiving section or by employing a directivity synthesis theory to be explained later.

Figure 5:
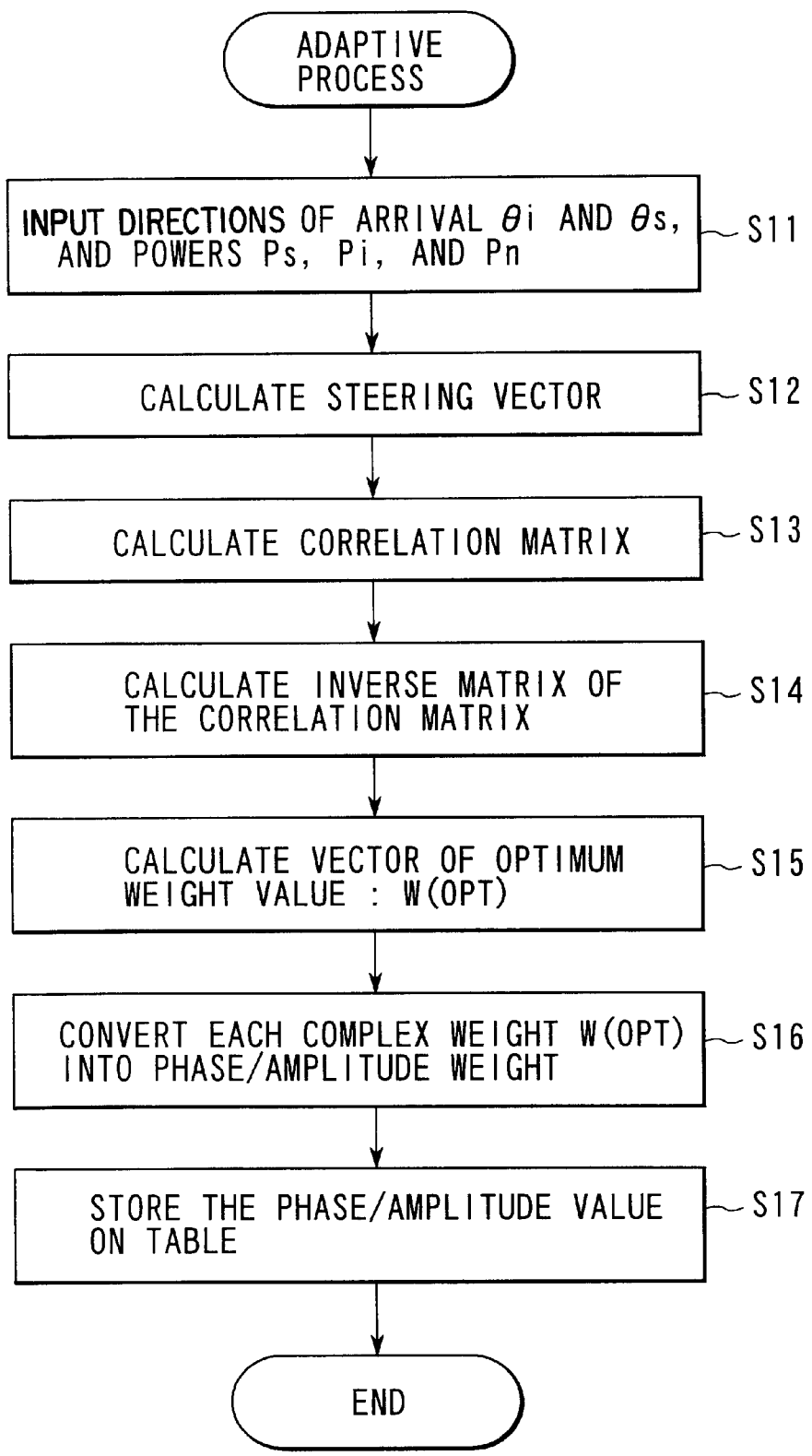
FIG. 5 is a flow chart showing an adaptive process to determine the weight value of a receiving section used in the first embodiment.

FIG. 5 shows an example of the algorithm to obtain the optimum weight value of the receiving section on the basis of the adaptive processing theory of the array antennas. The algorithm is called an MSN algorithm. The MSN algorithm is suitable for optimization of the receiving directivity when the receiving powers and the direction of the desired wave and the undesired wave have already been obtained.

This adaptive process is executed by the microprocessor 36. First, direction of arrival θi of the undesired wave, direction of arrival θs of the desired wave, input power Ps of the desired wave, input power Pi of the undesired wave, and sum Pn of the thermal noise powers of the respective antenna elements in the receiving section, are input from the desired wave/undesired wave information inputting unit 35, to form input signal vector X(t) on the basis of the following equation (1), at step S11. In the equation (1), S(t) represents the desired wave vector, I(t) represents the undesired wave, and N(t) represents the noise power vector.

$$X(t)=S(t)+I(t)+N(t) \quad (1)$$

Subsequently, calculation of the steering vector $\bar{s}$ is executed at step S12. This is executed on the basis of the following equation (2). In the equation (2), d represents the antenna element interval, and λ represents C/fH, fH represents the hopping frequency.

$$\bar{s} = \left[\exp\left(j\frac{2\pi}{\lambda} \cdot dl \cdot \sin\theta_S\right), \ldots , \exp\left(j\frac{2\pi}{\lambda} \cdot dk \cdot \sin\theta_S\right)\right]T \quad (2)$$

Next, calculation of correlation matrix Rxx is executed on the basis of the following equation (3), at step S13. In the equation (3), E[·] represents an expectation value (an ensemble average, i.e. a time average).

$$Rxx=E[X(t)X^H(t)] \quad (3)$$

Next, calculation of inverse matrix Rxx$^{-1}$ of the correlation matrix Rxx is executed at step S14. Next, calculation of a vector of optimum weight vale :W(OPT) is executed on the basis of the following equation (4) at step S15.

$$W_{opt} = R_{xx}^{-1} \cdot \bar{s} = \begin{bmatrix} W_{opt1} \\ \vdots \\ W_{optlk} \end{bmatrix} = \begin{bmatrix} WR_{opt1} + jWI_{opt1} \\ \vdots \\ WR_{optk} + jWI_{optk} \end{bmatrix} \quad (4)$$

Subsequently, each complex weight W(OPT) is converted into a phase/amplitude weight on the basis of the following equation (5), at step S16.

$$\begin{cases} A_{optk} = (|WR_{optk}|^2 + |WI_{optk}|^2)^{\frac{1}{2}} \\ (i) \text{ When } WR_{optk} < 0 \text{ and } WI_{optk} > 0 \\ \phi_{optk} = \tan^{-1}\left(\frac{WI_{optk}}{WR_{optk}}\right) + \pi \\ (ii) \text{ When } WR_{optk} < 0 \text{ and } WI_{optk} < 0 \\ \phi_{optk} = \tan^{-1}\left(\frac{WI_{optk}}{WR_{optk}}\right) - \pi \\ (iii) \text{ In a case other than } (i) \text{ and } (ii) \\ \phi_{optk} = \tan^{-1}\left(\frac{WI_{optk}}{WR_{optk}}\right) \end{cases} \quad (5)$$

Finally, the phase/amplitude weight values are stored on the weight value table 29 at step S17.

In addition to this, there are MMSE (a minimum mean squares error method), CMA (an algorithm for a 15 constant envelope signal) and the like as the algorithms which obtain the optimum weight value of the receiving section, and the information that is needed in advance is different in the algorithms.

Figure 6:
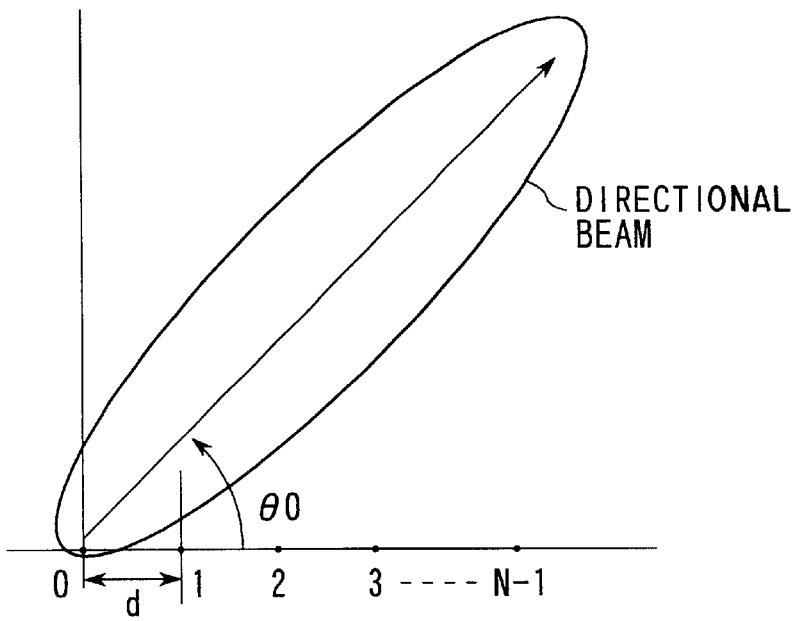
FIG. 6 is a graph explaining a method of adjusting the weight value at the transmitting section of the base station and synthesizing a transmission beam at an angle θ0, in the first embodiment.

FIG. 6 shows an example of synthesis of the directivity in the transmitting section. There are some directivity synthesis theories of the array antenna, and a basic equation that expresses the synthetic directivity of the linear array antenna is represented by the following equation (6).

$$E(\theta) = \sum_{n=0}^{N-1} An \exp\{jnkd(\cos\theta - \cos\theta_o)\} \quad (6)$$

k=2π/λ(where λ represents wave length) The equation (6) is applied only when the directivity faces in a direction of θ0 (where θ0 represents a desired direction). E(θ) represents the amplitude in the direction θ, and An represents an amplitude weight value (a coefficient of weight) for an n-th element.

In FIG. 6, N number of antenna elements are aligned with an interval d and the directivity is combined in the direction of θ0 by using the equation (6). This figure expresses the simplest example of adjusting the weight value by the transmitting section of the base station and synthesizing the transmission beam at an angle of θ0. In the figure, black points 0 to N–1 represent the respective elements of the array antenna. To synthesize the directivity of the beam in the desired direction θ0, the excitation phase of the n-th element can be set at n·k·d·cos θ0. As a result, radio waves with the adjusted phases are directed and radiated from a plurality of antenna elements 21 in the desired direction θ0. The value of An can be determined in a mathematical method. If the side robe is restricted to be low in this method, the Dolph-Chebyshev array antenna, the Talor distribution array antenna, and the like are obtained.

Thus, the desired directivity can be obtained by adjusting the weight values of the phases and amplitudes, also in the transmitting section, but there are various kinds of transmitting directivity synthesizing methods other than this.

Figure 7:
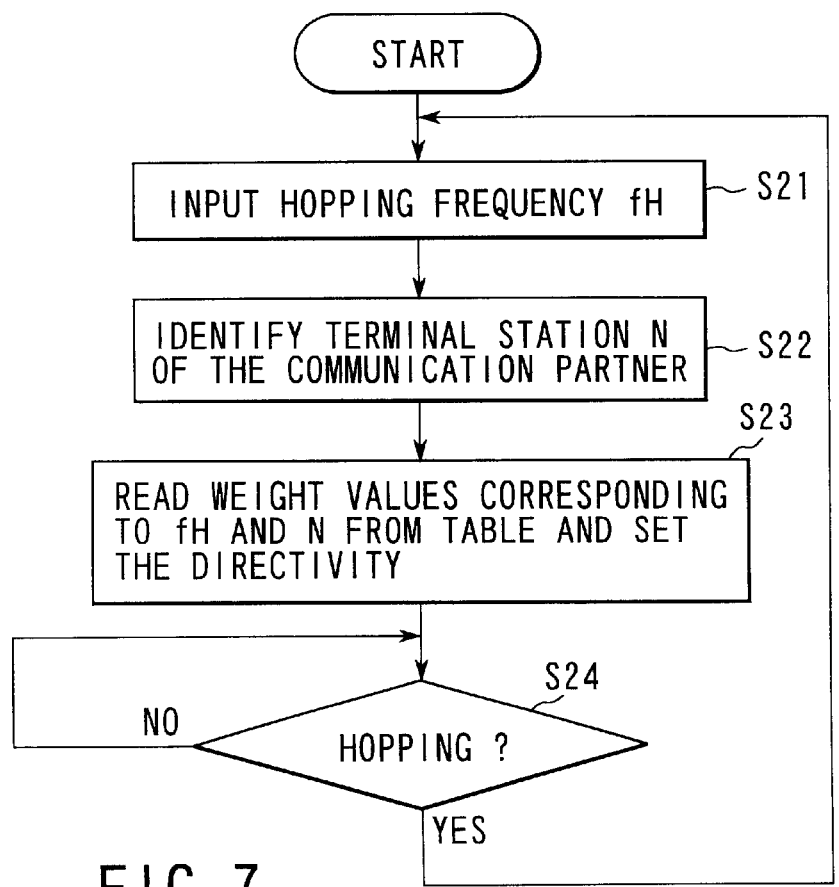
FIG. 7 is a flow chart showing the change control of the weight value for the directivity control, in the first embodiment.

FIG. 7 is a flow chart showing the switching control of the weight value to change the antenna directivity when the base stations 12 and 13 perform radio communication with the terminal stations N1–N3 and N11–N13 in the frequency hopping spread spectrum modulation.

First, hopping frequency fH is input from the memory unit 37 by the startup of the system at step S21, and then a terminal station N of the communication partner is identified in the communication protocol at step S22. This identification is executed on the basis of a request for communication and the terminal station identification data, which are transmitted from the terminal station. Next, the amplitude and phase weight values of the transmitting section and the receiving section that correspond to the partner's terminal station N and the hopping frequency fH are read from the weight value table 29 and set in the weight value setting unit 39, at step S23. The weight value setting unit 39 outputs the amplitude and phase weight values to the attenuators 24 and 33, and the phase shifters 25 and 32, and keeps the values. As a result, the optimum directivity of the transmitting section and the receiving section to the hopping frequency fH of the array antenna is set.

In this state, communication with the identified terminal station is made and whether or not the hopping frequency needs to be changed in accordance with the switching signal from the timer unit 38 is checked at step S24. If the change of the hopping is needed, the operation returns to step S21, and a next hopping frequency fH is input and the same process is repeated. In the present embodiment, the weight value table 29 in each of the base stations 12 and 13 stores in advance the weight values of the receiving section and the transmitting section for each terminal station, each hopping frequency, and each antenna element 21, on the basis of the preliminary calculation, as described above.

Thus, when the base station 11 performs communication with the terminal station N1 with frequency fH, the optimum directivity of the receiving section and the transmitting section is set. When a certain time has passed and the frequency shifts to a next hopping frequency fH, the weight values of the receiving section and transmitting section that respond to the frequency are read and set in the attenuators 24 and 33, and the phase shifters 25 and 32, and the optimum directivity of the receiving section and the transmitting section at the hopping frequency fH are set to perform communication.

Therefore, even if the carrier frequency is changed by the hopping, the optimum directivity can be always controlled by using the suitable weight value responding to the frequency, in the present embodiment. As a result, the radio communication can be certainly made at any time.

Further, the present embodiment does not use the values calculated at real time, but the weight values that are calculated in advance and stored in the weight value table 29 as the weight values of the receiving section and the transmitting section. Therefore, a high-speed response required for a real-time process is not needed. That is, most of the operations can be made in the software process and the hardware structure can be simplified.

Second Embodiment

Figure 8:
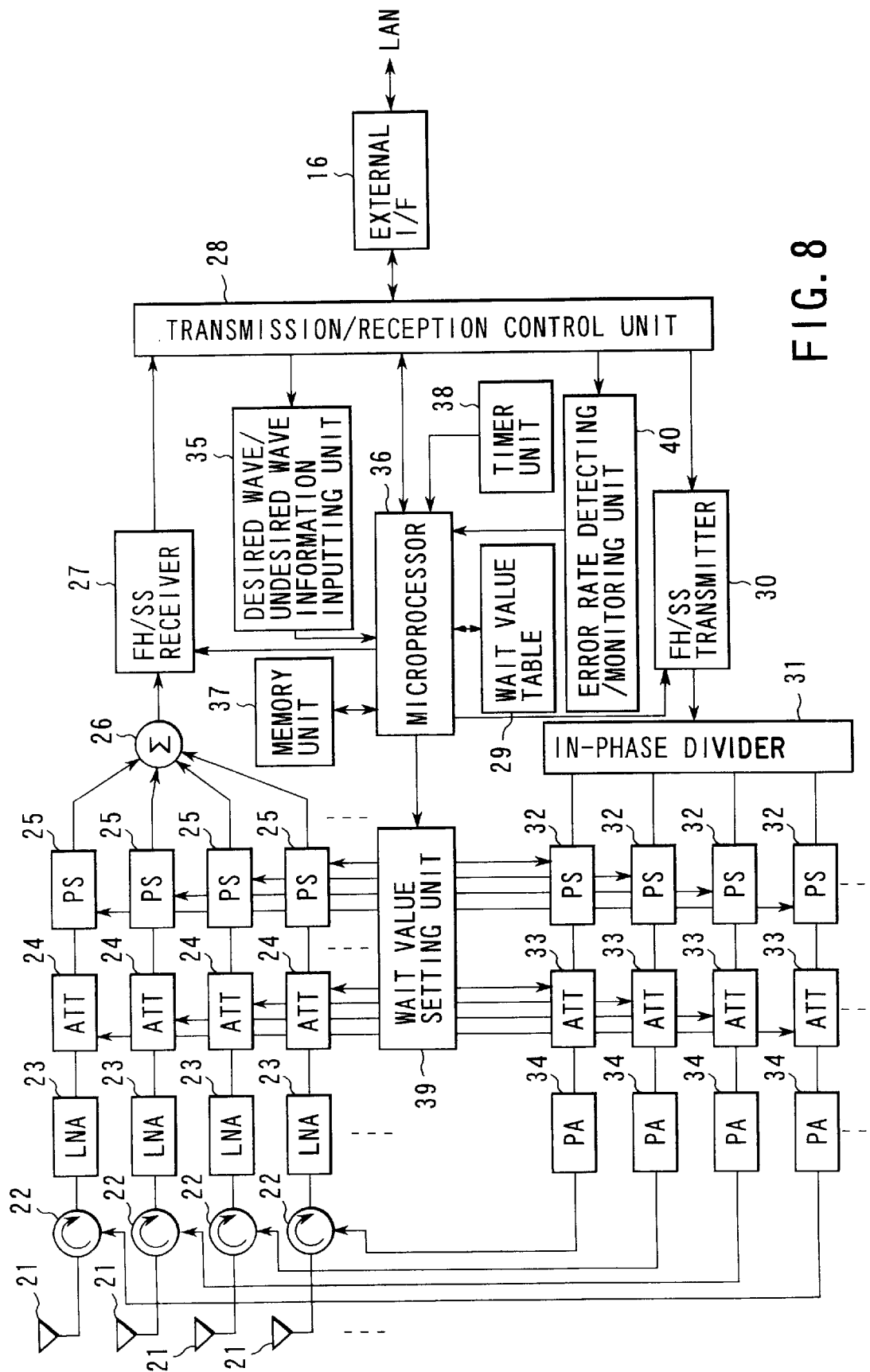
FIG. 8 is a block diagram showing a circuit configuration of a base station according to a second embodiment of the present invention.

FIG. 8 is a block diagram showing a circuit configuration of the base station according to a second embodiment of the present invention. The same portions as those of the first embodiment are denoted by the same reference numerals, and different portions will be explained here. In the second embodiment, an error rate detecting/monitoring unit 40 for detecting the variation in the error rate caused by the hit of the hopping frequency is added to the structure of the base station of the first embodiment.

Figure 9:
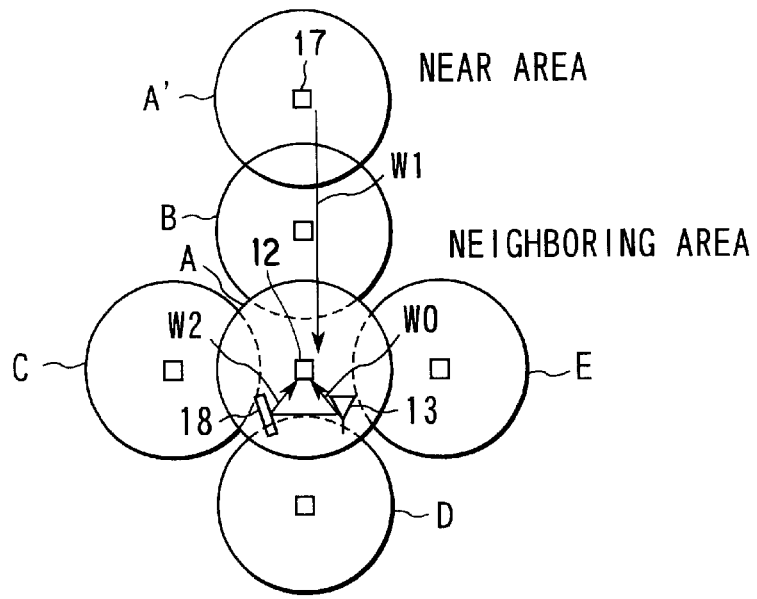
FIG. 9 is a diagram explaining a case where the error rate is increased, in the second embodiment.

In the case of employing the frequency hopping, a problem of the increase in the error rate, which results from the increase in the frequency hit rate with a near area, arises. As shown in FIG. 9, for example, a base station 12 of area A is set to allow the frequency to be hopped in a different hopping series from the frequency of the base station in neighboring area B, C, D or E, so that the frequencies do not become the same, i.e. the frequencies do not hit.

However, a base station 17 of near area A', which is not a neighboring area, may hop the frequency in the same hopping series as that of the base station 12 of area A. In this case, the frequency hit rate will be made higher by interference wave W1 of the other station, and the data error rate will be increased. This error is, for example, a CRC (cyclic redundancy check code) error and a transfer packet number error.

In addition, when the radio propagation environment is changed as the time goes by due to the increase/decrease of persons and the movement of utensils, the error rate will be increased by the influence from the multipass interference wave in the same area, at the low-speed frequency hopping where the hopping rate is lower than the data rate. As shown in FIG. 9, for example, the radio wave radiated from a terminal station 13 reaches the base station 12 as a direct wave W0 and also reaches as a multipass W2 after reflecting on a structural material (a wall, a floor, or a ceiling) or a utensil 18. In this case, the error rate is also increased.

To solve this, the error rate detecting/monitoring unit 40 detects the increase in the error rate, and microprocessor 36 calculates again the weight values on the basis of the information from the desired wave/undesired wave information inputting unit 35 and rewrites the weight values of the receiving section and the transmitting section stored on the weight value table 29.

Figure 10:
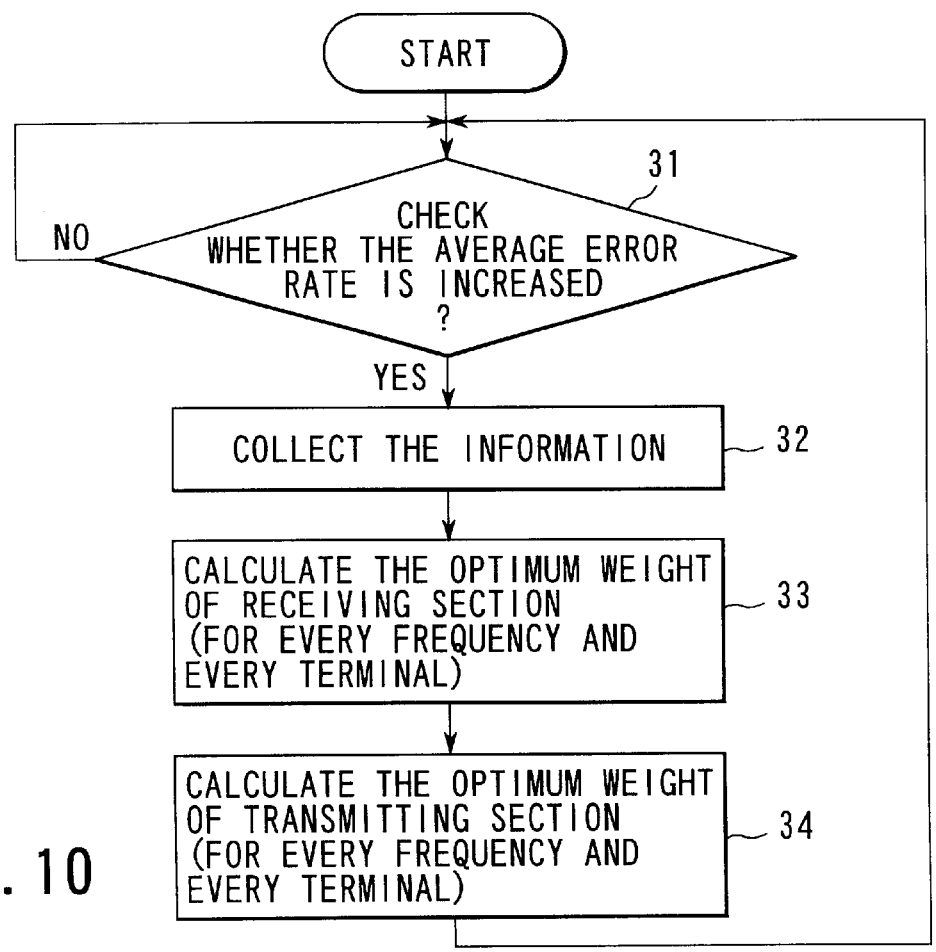
FIG. 10 is a flow chart showing a recalculating process of the weight value in the second embodiment.
Figure 11:
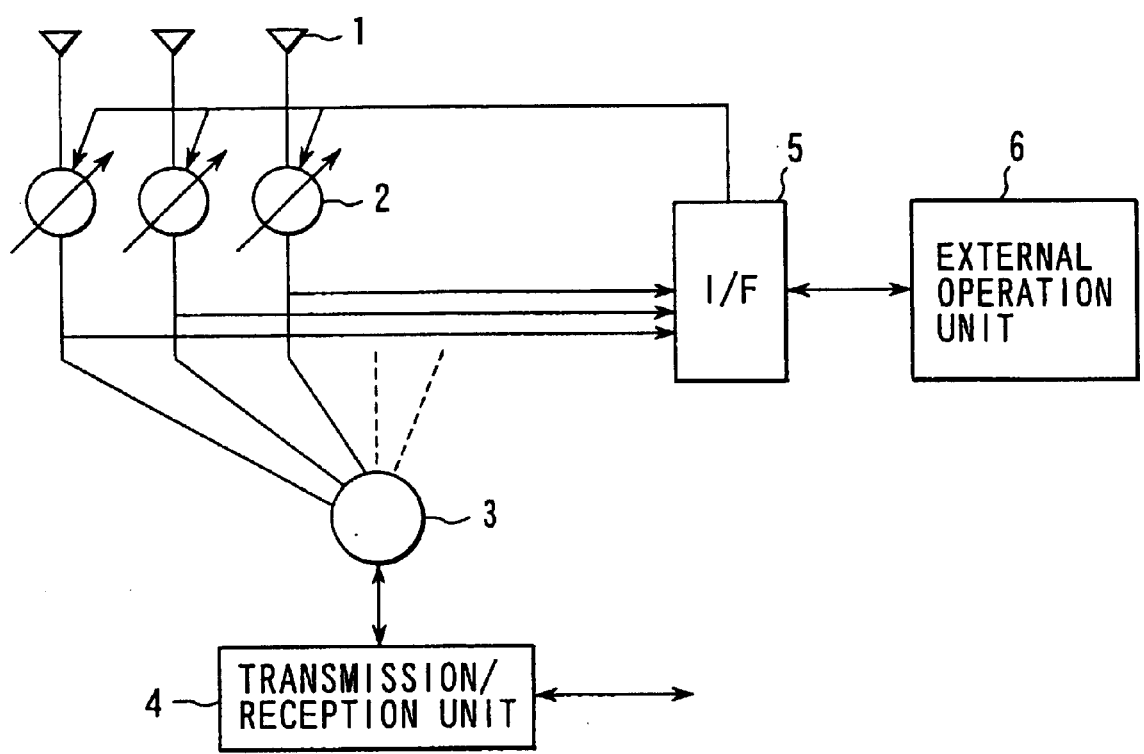
FIG. 11 is a block diagram showing the prior art.

In other words, the microprocessor 36 first checks whether or not the average error rate is increased for each terminal station, at step S31 in FIG. 10. When the microprocessor 36 detects the increase in the error rate, it collects the information at step S32. The collection of the information is executed as shown in FIG. 3. That is, the microprocessor 36 measures and/or calculates the direction of arrival of the desired wave from each terminal station, the direction of arrival of the undesired wave from the undesired wave generation source, their receiving powers, and stores them in the desired wave/undesired wave information inputting unit 35.

Subsequently, the microprocessor 36 executes the optimum weight calculation of the receiving section for every frequency and every terminal station in accordance with the adaptive process algorithm of FIG. 5, at step S33. Next, the microprocessor 36 executes the optimum weight calculation of the transmitting section for every frequency, every terminal station, and every antenna element, by the synthesis of the transmitting section directivity described in FIG. 6, at step S34. Thus, when the error rate is increased due to the change of the radio propagation environment, the microprocessor 36 calculates again the weight values and rewrites the weight values on the weight value table 29. The operation returns again to the checking of the variation in the average error rate at step S31.

Thus, the present embodiment can allow the control of the optimum directivity to sufficiently follow the increase in the error rate, which is caused by the change of the radio propagation environment such as the increase in the hit rate of the hopping frequency and the increase in the multipass, and can thereby make preferable radio communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system including a base station and a plurality of terminal stations each communicating with the base station by radio in a frequency hopping spread spectrum, said base station having a radio communication apparatus comprising a receiving section for demodulating a signal obtained by multiplying an amplitude and a phase of each of receiving signals from a plurality of antenna elements with a weight value and synthesizing the signals, and a transmitting section for distributing the modulated signal into a plurality of signals, multiplying an amplitude and a phase of each of the divided signals by weight values, and radiating the signals from the respective antenna elements, said base station comprising:
weight value storing means for storing the weight values of said receiving section and said transmitting section, that correspond to each of said terminal stations and each of hopping frequencies, before communication is carried out with each of the terminal stations; and
directivity controlling means for first identifying a communication partner when a radio communication is carried out with each of the terminal stations, and for then reading the weight values of said transmitting section and said receiving section corresponding to said frequency and each of said terminal stations from said weight value storing means every time a carrier frequency is hopped, and controlling the directivity of said transmitting section and said receiving section.

2. A system according to claim 1, wherein said weight value storing means includes means for storing the weight values of said receiving section and said transmitting section, that correspond to each of said antenna elements, and every time the carrier frequency is hopped, said directivity controlling means reads the weight values of said transmitting section and said receiving section corresponding to the frequency, each of said terminal stations and each of said antenna elements from said weight value storing means and controls the directivity of said transmitting section and said receiving section.

3. A system according to claim 1, wherein each of said terminal stations is connected to each of POS terminals in a wireless POS system in which a host device for managing overall sales of a store and the plural POS terminals for registering goods sale data at respective counters perform radio transmission and reception of the data.

4. A radio communication system including a base station and a plurality of terminal stations each communicating with the base station in a frequency hopping spread spectrum, said base station having a radio communication apparatus comprising a receiving section for demodulating a signal obtained by multiplying an amplitude and a phase of each of receiving signals from a plurality of antenna elements by weight values and synthesizing the signals, and a transmitting section for distributing the modulated signal into a plurality of signals, multiplying an amplitude and a phase of each of the divided signals by weight values, and radiating the signals from the respective antenna elements, said base station comprising:
weight value storing means for storing the weight values of said receiving section and said transmitting section, that correspond to each of said terminal stations and each of hopping frequencies;
directivity controlling means, every time a carrier frequency is hopped at the time of performing radio communication with each of said terminal stations, for reading the weight values of said transmitting section and said receiving section, that correspond to said frequency and each of said terminal stations from said weight value storing means, and controlling the directivity of said transmitting section and said receiving section;
error rate detecting means for detecting variation in a data error rate in the signal received by said receiving section, for each of said terminal stations; and
weight value rewriting means, when said error rate detecting means detects increase in the error rate of a terminal station, for calculating again and rewriting the weight values of said receiving section and said transmitting section corresponding to said terminal station in said weight value storing means.

5. A system according to claim 4, wherein said weight value storing means includes means for storing the weight values of said receiving section and said transmitting section, that correspond to each of said antenna elements, and every time the carrier frequency is hopped, said directivity controlling means reads the weight values of said transmitting section and said receiving section corresponding to the frequency, each of said terminal stations and each of said antenna elements from said weight value storing means and controls the directivity of said transmitting section and said receiving section.

6. A system according to claim 4, wherein each of said terminal stations is connected to each of POS terminals in a wireless POS system in which a host device for managing overall sales of a store and the plural POS terminals for registering goods sale data at respective counters perform radio transmission and reception of the data.

* * * * *